T. B. WYLIE.
DRY GAS METER.
APPLICATION FILED OCT. 24, 1906.

954,239.

Patented Apr. 5, 1910.
3 SHEETS—SHEET 1.

WITNESSES
R. A. Balderson
W. W. Swartz

INVENTOR
Thomas B. Wylie
by Dertever & Bymes
his attys

T. B. WYLIE.
DRY GAS METER.
APPLICATION FILED OCT. 24, 1906.

954,239.

Patented Apr. 5, 1910.
3 SHEETS—SHEET 3.

WITNESSES
R A Balderson
W.W. Swartz

INVENTOR
Thomas B. Wylie
by Bakewell & Byrnes
his attys

UNITED STATES PATENT OFFICE.

THOMAS B. WYLIE, OF OSBORNE, PENNSYLVANIA.

DRY GAS-METER.

954,239.  Specification of Letters Patent.  Patented Apr. 5, 1910.

Application filed October 24, 1906. Serial No. 340,331.

*To all whom it may concern:*

Be it known that I, THOMAS B. WYLIE, of Osborne, Allegheny county, Pennsylvania, have invented a new and useful Dry Gas-Meter, of which the following is a full, clear, and exact description, reference being had to the accompanying drawings, forming part of this specification, in which—

Figure 1:
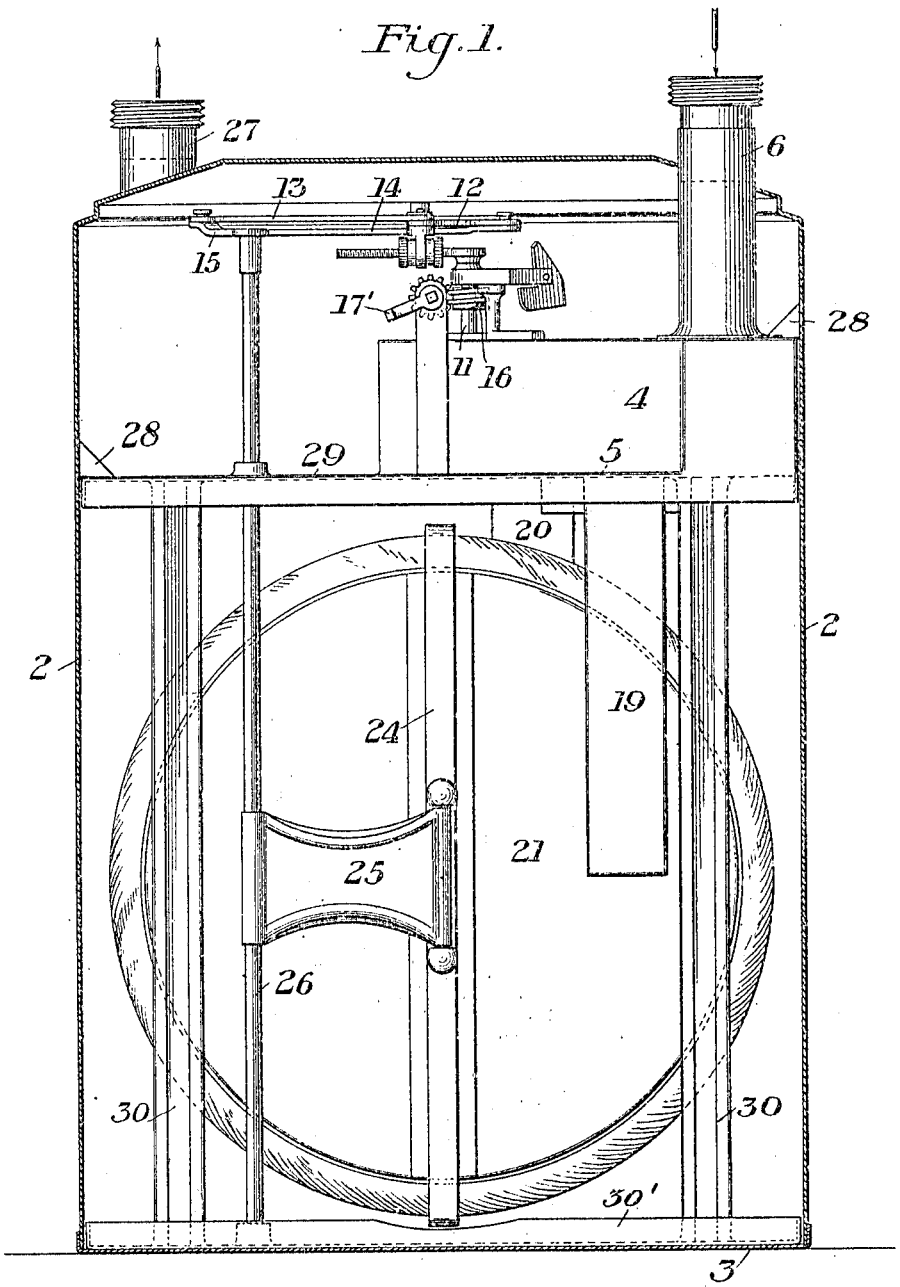
Figure 2:
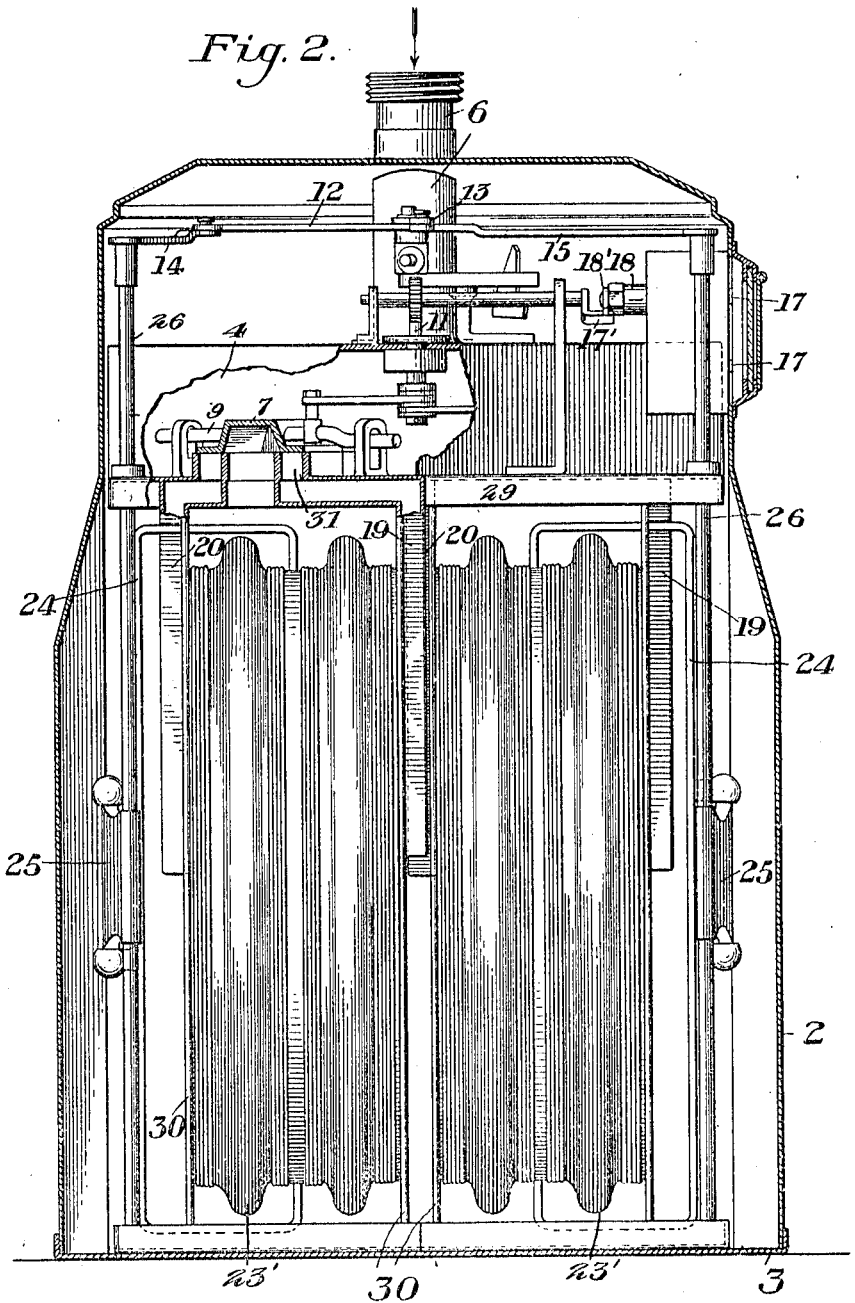
Figure 3:
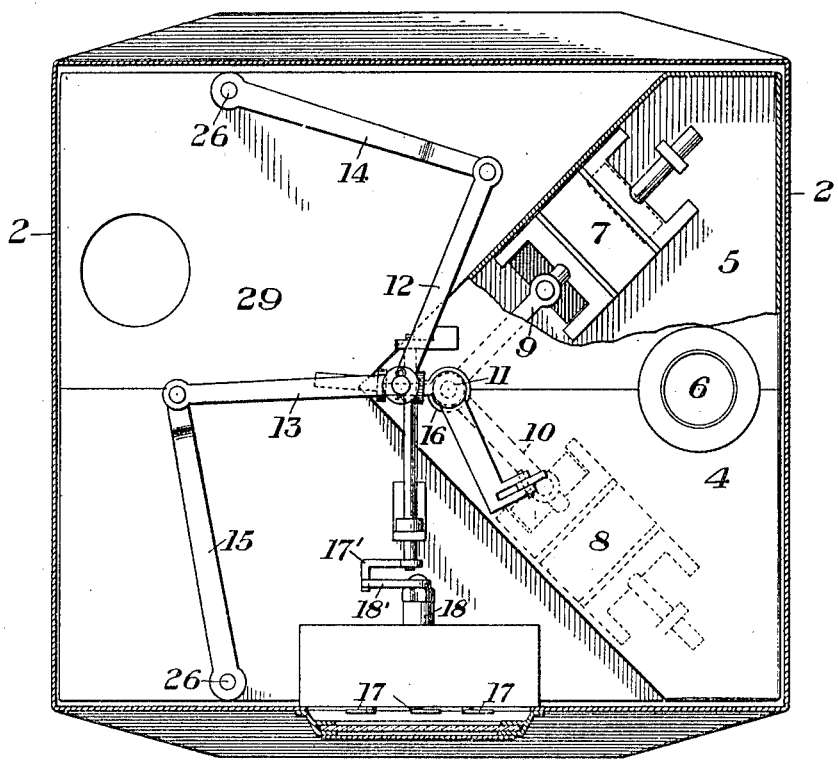
Figure 4:
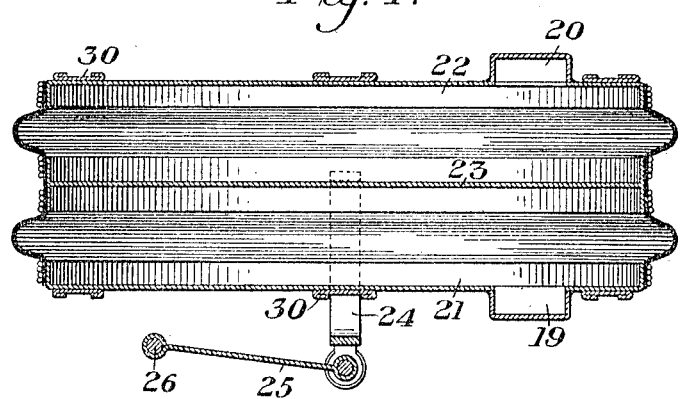

Figure 1 is a sectional front elevation of my improved meter; Fig. 2 is a sectional side elevation of the same; Fig. 3 is a sectional plan view; and Fig. 4 is a central vertical section showing one of the bellows-motors.

My invention relates to the class of dry meters wherein bellows motors are employed, and is designed to provide a meter of this character which can be easily tested and regulated.

It consists in providing a dry gas meter with bellows-motors which are so arranged that the fluid under pressure is supplied to the interior thereof while the exhaust or discharge passes into the case surrounding them.

It further consists in making the case independent of the motor face plates in such combinations, so that it can be removed without disturbing the motors. In this way, the parts may be examined while in operation, the case being removed; and the bellows and other parts may be thus easily tested and regulated.

In the drawings, 2 represents the general case which I have shown as fitting removably into a base 3. Within this case and supported by independent framing composed of an upper flanged plate 29 and a lower flanged plate 30' connected by flat bars 30, are the working parts of the motor. At the top of the frame-work is carried the valve box 4, the bottom 5 of which forms the valve table. The inlet pipe 6 leads into the top of this valve case, and within it are provided the usual D valves 7 and 8 connected to the links 9 and 10. These links are connected to cranks on the vertical shaft 11 which extends through a stuffing box in the top of the valve box, and is provided above said box with a crank driven by links 12 and 13 connected to the usual flag arms or cranks 14 and 15. This shaft is also provided with worm gear 16 having connections to drive the meter dials, shown at 17. These connections comprise a crank 17' on the worm wheel shaft which is arranged to contact with and turn a lever arm 18' on a shaft leading through stuffing box 18 to the meter dial mechanism. The meter dial mechanism is secured in its own case which is fastened to the side or face of the general case 2 and is removable with it. Each valve controls three ports leading through the valve table of which the two outer ports are inlets and the intermediate is the exhaust into the case. The two outer supply and exhaust ports 19 and 20 of each set are extended downwardly and lead down into diaphragm chambers 21 and 22, these being separated by the reciprocating partition or diaphragm plate 23. I provide four of these diaphragm chambers, two for each D valve, each provided with the annular flexible diaphragm 23' extending around it. I have shown these diaphragms as formed of a common piece of leather or other flexible material, bound in the usual manner on the flanges of the cover plates 21 and 22 and the flanges of the diaphragm plates 23 forming the two chambers. To the edge portion of the partition 23 of each motor are fastened the ends of a yoke or U-shaped strap 24 at the center of which is pivoted the lever 25 secured to the rock shaft 26. The cranks or flag arms 14 and 15 are secured to these rock shafts which act to move the valves and actuate the meter dials. The central outlet port 31 for each valve leads down through the valve table and opens into the case, from which the gas or fluid being measured passes out through the pipe 27.

The gas is fed in through the supply pipe 6 into the valve box and passes through the ports controlled by the D valves into the supply ports for the four chambers. It exhausts from these chambers alternately into the case or body and passes out through the outlet 27.

In testing the apparatus, the entire case is lifted off and the supply pipe is then connected to a source of fluid under pressure. Before lifting the case, the upper screw-threaded parts of pipes 6 and 27 which telescope within the pipes proper, are withdrawn, and if the pipes are soldered where they pass through the case, this solder is broken. The entire working parts may then be examined during the operation of the meter which will of course discharge into the open air during this period. Any leaks in the motors can be easily detected and remedied, and parts may be adjusted to bring them into correct relation with each other. On replacing the case, the crank arm on the worm shaft may be brought into correct relation to the meter dial lever, and the device is ready for use. The case is preferably provided with intermediate stops 28 which contact with the valve box and the spacing partition 29, and hold the lever 18' in proper vertical relation to its actuating crank 17', by stopping the interior parts in a certain vertical position.

The vertical posts or bars 30 of the frame are soldered or otherwise rigidly secured to the outer face plates 21 and 22 of the motors, and during the operation of the device the partitions 23 have the reciprocating movement.

The advantages of my invention result from the use of diaphragm chambers which are subject to inlet supply pressure on their interior only and discharge into the case. By this peculiar arrangement of the motors, I not only am enabled to give access to them during testing and adjustment, but I also effectually prevent the diaphragms from collapsing inwardly. The entire case except the bottom may be lifted in one part to expose the working parts of the apparatus, the meter dial case being taken off with the general case.

The base 3 will usually be made as a base only, and the bottom proper will be soldered or otherwise secured to the case 2 after the meter has been proven and tested at the factory. To get access therefore to any part of the motors or diaphragms, it is only necessary to unsolder or detach the bottom from the outer case, disconnect the inlet pipe, and then lift off the entire case. This at once gives access to everything except the valves in their box.

Many changes may be made in the form and arrangement of the bellows-motors, valves, etc., without departing from my invention.

I claim:—

1. In a dry gas meter, a case, a bellows motor having a reciprocating diaphragm plate, stationary face plates on opposite sides thereof and independent of the case, a flexible diaphragm connecting the diaphragm plate to the stationary face plates independent of the case, channels for supplying fluid under pressure successively to both sides of the reciprocating plate, valve mechanism controlling the supply fluid, and an exhaust passage leading into the case containing the motor, substantially as described.

2. In a dry gas meter, a case, a pair of bellows motors therein, each motor having stationary face plates, a reciprocating diaphragm plate located between the face plates, a flexible diaphragm connecting the diaphragm plate to the stationary face plates independent of the case, controller valves, means connecting the controller valves and the bellows motors, the motors having inlet ports leading from the valves to the interior of the motors, and exhaust ports arranged to feed gas from the motors into the case, substantially as described.

3. In a dry gas meter, a pair of bellows motors, each having a pair of stationary face plates, a reciprocating diaphragm plate between the face plates and a flexible diaphragm connecting the diaphragm plate to the respective face plates, and a removable case having a single common chamber containing both motors and independent thereof, each motor having an exhaust port discharging into the case, substantially as described.

4. In a dry gas meter, a pair of bellows motors each having a pair of stationary face plates, a reciprocating diaphragm plate between the face plates, and a flexible diaphragm connecting the diaphragm plate to the respective stationary face plates, a removable case having a single common chamber containing both motors and independent thereof, meter dial apparatus secured to the case, detachable dial-driving connections and motor-actuated means for driving the dial-driving connections, substantially as described.

5. In a dry gas meter, a pair of bellows motors, each comprising a pair of stationary face plates, a reciprocating diaphragm plate between the face plates, a flexible diaphragm connecting the reciprocating plate with the face plates, the reciprocating diaphragm dividing each bellows motor into two chambers, a case independent of and surrounding the motors, a supply pipe leading to the interior of each chamber of each motor, means to supply fluid alternately to the pipes, each motor having an exhaust port discharging into the case, substantially as described.

6. In a dry gas meter, a bellows motor comprising stationary face plates, a reciprocating diaphragm plate between the face plates, a flexible diaphragm connecting the diaphragm plate with the respective face plates, a case surrounding the bellows motor and separate therefrom, there being supply passages for the chambers of the motors, a valve controlling the supply of fluid alternately to the interior of each chamber of the motor, a crank connected to the edge portion of the diaphragm plate, an operating connection between the crank and the valve, substantially as described.

7. In a dry gas meter, a case, a pair of bellows motors independent thereof, controller valves, means connecting the controller valves and bellows motors, there being communication from the valves to the interior of the bellows motors and also from the motors into the case, the case being removable from the aforementioned parts to give access thereto, a meter dial mechanism secured to and removable with the case, and a separable driving connection between the dial mechanism and a moving part of the meter, substantially as described.

8. In a dry gas meter, the combination with a fluid motor made up of a pair of stationary face plates, an intermediate reciprocating diaphragm plate, and a flexible diaphragm connecting the reciprocating plate with the face plates, of a case inclosing said parts and freely removable therefrom to expose them, there being communication from a source of supply into the motor and also from the motor into the case, valve mechanism for controlling the supply of gas to the motor successively at opposite sides of the reciprocating diaphragm and for controlling the discharge successively from each side of the reciprocating diaphragm into the case, and valve actuating mechanism controlled by the motor, substantially as described.

9. In a dry gas meter, the combination with a fluid motor comprising stationary face plates, an intermediate reciprocating diaphragm plate, and a flexible diaphragm connecting the reciprocating plate with the face plates, of a case inclosing said parts and freely removable to expose them, there being communication from a source of supply into the motor and also from the motor into the case, valve mechanism controlling the supply of gas to the motor successively at opposite sides of the reciprocating diaphragm and controlling the discharge successively from each side of said diaphragm into the case, valve-actuating mechanism controlled by the motor, and registering mechanism carried by and removable with the case, substantially as described.

10. In a dry gas meter, the combination of a base, a pair of fluid motors mounted thereon, valve-actuating mechanism controlled by the motors, and a casing common to said parts and freely removable from the base to expose the motors and valve-actuating mechanism, the operating parts being independent of the case, substantially as described.

11. In a dry gas meter, the combination of a base, a pair of fluid motors mounted thereon, each motor having a pair of stationary face plates, an intermediate reciprocating diaphragm plate, and a flexible diaphragm connecting the diaphragm plate to the face plates, a case inclosing said parts and freely removable from the base to expose them, there being communication from a source of supply to each motor and also from each motor into the case, valve mechanism for each motor for controlling the supply of gas successively to opposite sides of the reciprocating diaphragm plate and for controlling the discharge successively from each side of the diaphragm plate into the case, and valve-actuating mechanism controlled by the motors, substantially as described.

12. In a dry gas meter, a fluid motor having a pair of stationary face plates, an intermediate reciprocating diaphragm plate, and a flexible diaphragm connecting the diaphragm plate to the face plates, a case inclosing the fluid motor independent thereof and freely removable therefrom, there being communication from a source of supply to the motor and also from the motor to the case, valve mechanism for controlling the supply of gas to the motor successively at opposite sides of the diaphragm plate and for controlling the discharge successively from opposite sides of said plate into the case, valve-actuating mechanism controlled by the motor, and register mechanism carried by the casing and having freely separable actuating engagement with the motor.

13. In a dry gas meter, a double acting fluid motor having a pair of spaced stationary face plates, an intermediate reciprocating diaphragm plate, a flexible diaphragm connecting the diaphragm plate with the face plates, a gas-receiving chamber having passages communicating with the motor at opposite sides of the reciprocating diaphragm plate, a casing surrounding the parts and independent thereof, there being a passage leading from the gas-receiving chamber into the casing and mechanism including a single valve controlling the passages to supply gas to the motor successively at opposite sides of the reciprocating diaphragm plate and to discharge gas successively from opposite sides of the reciprocating diaphragm plate into the casing, substantially as described.

In testimony whereof, I have hereunto set my hand.

THOMAS B. WYLIE.

Witnesses:
G. B. BLEMING,
H. M. CORWIN.